(12) United States Patent
DeBry (10) Patent No.: US 10,997,427 B1
(45) Date of Patent: May 4, 2021

(54) USING MOTION-BASED FEATURES TO MATCH VIDEO SEQUENCES

(71) Applicant: Zorroa Corporation, Berkeley, CA (US)

(72) Inventor: David DeBry, Salt Lake City, UT (US)

(73) Assignee: Zorroa Corporation, Berkeley, CA (US)

( * ) Notice: Subject to any disclaimer, the term of this patent is extended or adjusted under 35 U.S.C. 154(b) by 223 days.

(21) Appl. No.: 16/234,250

(22) Filed: Dec. 27, 2018

Related U.S. Application Data (60) Provisional application No. 62/662,729, filed on Apr. 25, 2018.

(51) Int. Cl.
| | |
|---|---|
| H04N 11/02 | (2006.01) |
| G06K 9/00 | (2006.01) |
| G06T 7/246 | (2017.01) |
| G06F 16/71 | (2019.01) |
| G06F 16/783 | (2019.01) |
| G06F 16/787 | (2019.01) |

(52) U.S. Cl.
CPC ......... *G06K 9/00758* (2013.01); *G06F 16/71* (2019.01); *G06F 16/783* (2019.01); *G06F 16/787* (2019.01); *G06K 9/00744* (2013.01); *G06T 7/248* (2017.01); *G06T 2207/10016* (2013.01)

(58) Field of Classification Search
CPC ........... G06K 9/00744; G06K 9/00758; G06K 9/3241; G06K 2009/6864; G06K 2209/01; G06K 9/00469; G06K 9/00677; G06K 9/4628; G06K 9/6218; G06K 9/6247; G06K 9/6253; G06K 9/6256; G06K 9/685; G06K 9/726; G06F 16/683; G06F 16/783; G06F 16/7834; G06F 16/7847; G06F 16/71; G06F 16/787; G06T 1/0028; G06T 1/005; G06T 7/248; G06T 2207/10016; G10L 25/18; G10L 25/54; G11B 2020/10537; H04N 1/00018; H04N 1/00034; H04N 1/00082
See application file for complete search history.

(56) References Cited

U.S. PATENT DOCUMENTS

| | | | |
|---|---|---|---|
| 8,259,806 B2* | 9/2012 | Radhakrishnan | G06T 1/0028 375/240.15 |
| 8,494,234 B1* | 7/2013 | Bozinovic | G06K 9/3241 382/124 |
| 2015/0029211 A1* | 1/2015 | Weber | G09G 3/00 345/592 |

* cited by examiner

*Primary Examiner* — Kim Y Vu
*Assistant Examiner* — Michael J Vanchy, Jr.
(74) *Attorney, Agent, or Firm* — Morgan, Lewis & Bockius LLP (57) ABSTRACT

A method is performed at a computing system having one or more processors and memory. The method includes receiving a first video clip having three or more image frames and computing a first hash pattern, including: (i) computing a temporal sequence of differential frames and (ii) for each differential frame: identifying a respective plurality of feature points and computing a respective hash value that represents spatial positioning of the respective feature points with respect to each other. The method includes receiving a second video clip having three or more image frames and computing a second hash pattern by applying steps (i) and (ii) to the three or more image frames. The method includes computing a distance between the first hash pattern and the second hash pattern and determining that the first and second video clips match when the computed distance is less than a threshold distance.

16 Claims, 6 Drawing Sheets

Frame N

Figure 4A

Frame N + 1

|  |  | 504 | 506 | 508 | 510 | 512 | 514 |  |  |
|---|---|---|---|---|---|---|---|---|---|
| 530 → | Comparison | 7 | 3 | 5 | 1 | 3 | 9 | 7 | 0 | 9 |
| 532 → | Search |  | 1 | 4 | 9 |  |  |  |  |  |
| 534 → | \|Difference\| |  | 2 | 1 | 8 |  |  |  |  |  |
|  | Sum |  |  | 11 |  |  |  |  |  |  |

Figure 5A ~536

| 530 → | Comparison | 7 | 3 | 5 | 1 | 3 | 9 | 7 | 0 | 9 |
|---|---|---|---|---|---|---|---|---|---|---|
| 542 → | Search |  |  | 1 | 4 | 9 |  |  |  |  |
| 544 → | \|Difference\| |  |  | 4 | 3 | 6 |  |  |  |  |
|  | Sum |  |  |  | 13 |  |  |  |  |  |

Figure 5B ~546

| 530 → | Comparison | 7 | 3 | 5 | 1 | 3 | 8 | 7 | 0 | 9 |
|---|---|---|---|---|---|---|---|---|---|---|
| 552 → | Search |  |  |  | 1 | 4 | 9 |  |  |  |
| 554 → | \|Difference\| |  |  |  | 0 | 1 | 1 |  |  |  |
|  | Sum |  |  |  |  | 2 |  |  |  |  |

Figure 5C ~556

| 530 → | Comparison | 7 | 3 | 5 | 1 | 3 | 8 | 7 | 0 | 9 |
|---|---|---|---|---|---|---|---|---|---|---|
| 562 → | Search |  |  |  |  | 1 | 4 | 9 |  |  |
| 564 → | \|Difference\| |  |  |  |  | 2 | 4 | 2 |  |  |
|  | Sum |  |  |  |  |  | 8 |  |  |  |

Figure 5D ~566

USING MOTION-BASED FEATURES TO MATCH VIDEO SEQUENCES

CROSS REFERENCE TO RELATED APPLICATIONS

This application claims priority to U.S. Provisional Application No. 62/662,729, filed Apr. 25, 2018, entitled "Methods and Systems for Matching Still Images and Video Sequences," which is incorporated herein by reference in its entirety.

TECHNICAL FIELD

The disclosed implementations relate generally to matching a video clip with videos in a film library and more specifically to using feature points to match the videos.

BACKGROUND

There are many conventional techniques for identifying a video sequence from a collection of video sequences when the video sequence has not been modified. If a given video clip (or film clip, or animation clip) has not been modified, techniques in computer vision and other fields already exist to find the matching source material for that clip within a large collection of other video clips.

However, if the given comparison clip has been modified, it becomes harder to match to the original source material. For example, if the clip has had its colors modified ("color corrected" in film parlance), or if the image has been transformed (e.g., scaled, rotated, shifted in the frame, and/or cropped), or any of a host of other image manipulation methods has been applied, existing computer vision techniques will fail. This is because those techniques are based on finding and matching "features" within one or more images within the video clip. Those features change when the image is modified, and comparisons between modified and unmodified clips fail.

SUMMARY

Implementations provide a method for determining features within a video clip that stays robust even after the application of many image modifications. This technique is also applicable when trying to identify source material from within a large collection of clips that includes several clips that are very similar to the clip being looked for. This happens frequently when there are multiple "takes" of the same shot within the collection.

In accordance with some implementations, a method of comparing video clips is performed at a computing system having one or more processors and memory. The method includes receiving a first video clip comprising a first temporal sequence of three or more image frames and computing a first hash pattern for the first video clip. Computing the first hash pattern includes (i) computing a temporal sequence of differential frames, each differential frame comprising pixel differences between a respective pair of consecutive image frames in the temporal sequence of three or more video frames and (ii) for each differential frame: identifying a respective plurality of feature points, and computing a respective hash value that represents spatial positioning of the respective feature points with respect to each other. The first hash pattern comprises the computed hash values. The method includes receiving a second video clip comprising a second temporal sequence of three or more image frames and computing a second hash pattern for the second video clip by applying steps (i) and (ii) to the second temporal sequence of three or more image frames. The method includes computing a distance between the first hash pattern and the second hash pattern as a sum of absolute differences between corresponding hash values in the first and second hash patterns and determining that the first and second video clips match when the computed distance is less than a threshold distance.

In some implementations, the second video clip includes more frames than the number of image frames in the first video clip.

In some implementations, the second hash pattern for the second video clip comprises a plurality of subsets of the second hash pattern. Each subset of the second hash pattern corresponds to a portion of the second video clip and each subset of the second hash pattern has a length equal to the length of the first hash pattern for the first set of frames.

In some implementations, the method further includes computing a distance between the first hash pattern and each subset of the second hash pattern. The method determines that a respective subset of the second hash pattern of the plurality of subsets of the second hash pattern is a match when the computed distance between the respective subset and the first hash pattern is smaller than the computed distances between the other subsets of the plurality of subsets and the first hash pattern.

In some implementations, a first image frame of the three or more image frames of the first temporal sequence comprises a first plurality of pixels and a second image frame of the three or more image frames of the first temporal sequence comprises a second plurality of pixels. Computing the temporal sequence of differential frames for the first temporal sequence comprises applying an optical flow algorithm to identify a motion vector corresponding to the first plurality of pixels compared with the second plurality of pixels.

In some implementations, the plurality of feature points identified for each differential frame include one or more of: (i) a set of brightest pixels of the respective frame, (ii) a set of pixels with steepest surrounding gradient, (iii) a set of pixels with brightness that satisfies a threshold, and (iv) a set of pixels that match a predefined shape.

In some implementations, computing the hash value for a differential frame comprises: (i) identifying three most prominent feature points of the respective differential frame; (ii) computing an area of a triangle formed by the three most prominent feature points; and (iii) specifying the hash value as the ratio of the area of the triangle to the area of the differential frame.

In some implementations, computing the hash value for a differential frame comprises identifying three most prominent feature points of the differential frame and specifying the hash value as a smallest angle formed by line segments between the three most prominent features.

In some implementations, computing the hash value for a differential frame comprises identifying three most prominent feature points of the differential frame and specifying the hash value as a single value that encodes an ordered sequence of angles formed by line segments between the three most prominent features.

In some implementations, the plurality of feature points identified in each differential frame correspond to the same set of feature points.

In some implementations, the method further comprises receiving a third video clip comprising a third temporal sequence of three or more image frames, comparing the pattern for the first set of frames with the pattern for the third set of frames to determine a match between the patterns, and computing a third hash pattern for the third video clip by applying steps (i) and (ii) to the third temporal sequence of three or more image frames. The method includes computing a distance between the first hash pattern and the third hash pattern as a sum of absolute differences between corresponding hash values in the first and third hash patterns and comparing the computed distance between the first hash pattern and the second hash pattern with the computed distance between the first hash pattern and the third hash pattern. The method includes, in accordance with a determination that the computed distance between the first hash pattern and the third hash pattern is less than the computed distance between the first hash pattern and the second hash pattern, determining that the first and third video clips match.

In accordance with some implementations, an electronic device has one or more processors and memory storing one or more programs executable by the one or more processors. The one or more programs include instructions for performing any of the methods described herein.

In accordance with some implementations, a non-transitory computer-readable storage medium has one or more processors and memory storing one or more programs executable by the one or more processors. The one or more programs include instructions for performing any of the methods described herein.

BRIEF DESCRIPTION OF THE DRAWINGS

Like reference numerals refer to corresponding parts throughout the drawings.

DESCRIPTION OF IMPLEMENTATIONS

Reference will now be made to various implementations, examples of which are illustrated in the accompanying drawings. In the following detailed description, numerous specific details are set forth in order to provide a thorough understanding of the invention and the described implementations. However, the invention may be practiced without these specific details. In other instances, well-known methods, procedures, components, and circuits have not been described in detail so as not to unnecessarily obscure aspects of the implementations.

Figure 1:
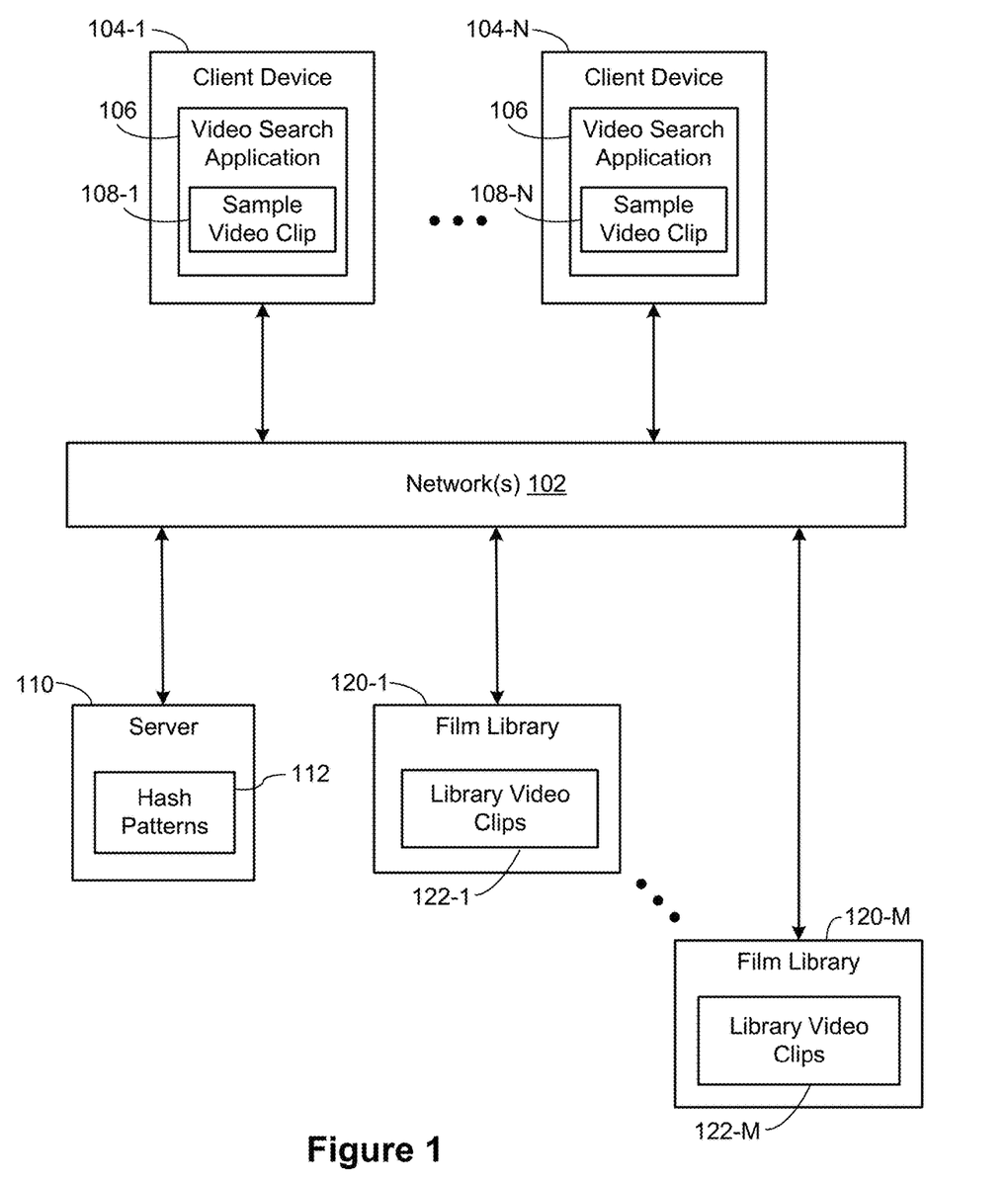
FIG. 1 is a block diagram of a context in which some implementations operate.

FIG. 1 illustrates a context in which some implementations operate. Film libraries 120 (e.g., libraries 120-1 to 120-M) store video clips 122 (e.g., video clips 122-1 to 122-M). A typical film library 120 stores millions of video clips or more. In some implementations, the video clips are movies or media files corresponding to an original set of film (e.g., reels including multiple takes of a scene).

In the illustrated implementation, there is a separate server 110, which stores information about the video clips 122 in the film libraries 120. In some implementations, the server 110 stores one or more film libraries 120, but typically the server 110 is distinct from the film libraries 120. The server 110 stores and/or computes a set of hash patterns 112. Each hash pattern is computed and used to match sample video clips 108 with corresponding library video clips 122.

The hash patterns 112 in the server 110 and the film libraries 120 are accessed by client devices 104 (e.g., the client devices 104-1 to 104-N) running a search application 106. When a user selects (e.g., inputs for search) a sample video clip 108 (e.g., sample video clips 108-1 to 108-N), the retrieval module 226 (at the client device 104 or the server 110) retrieves the relevant library video clips 122 or identification of the relevant library video clips 122. The relevant video clips are identified based on matching hash patterns 112, and the server returns the result set to the client device 104. The communication between the client devices 104, the server 110, and the film libraries 120 is over one or more networks 102, such as local networks and the Internet.

In some implementations, some or all of the functionality described with respect to the server 110 is performed by the client device 104.

Figure 2:
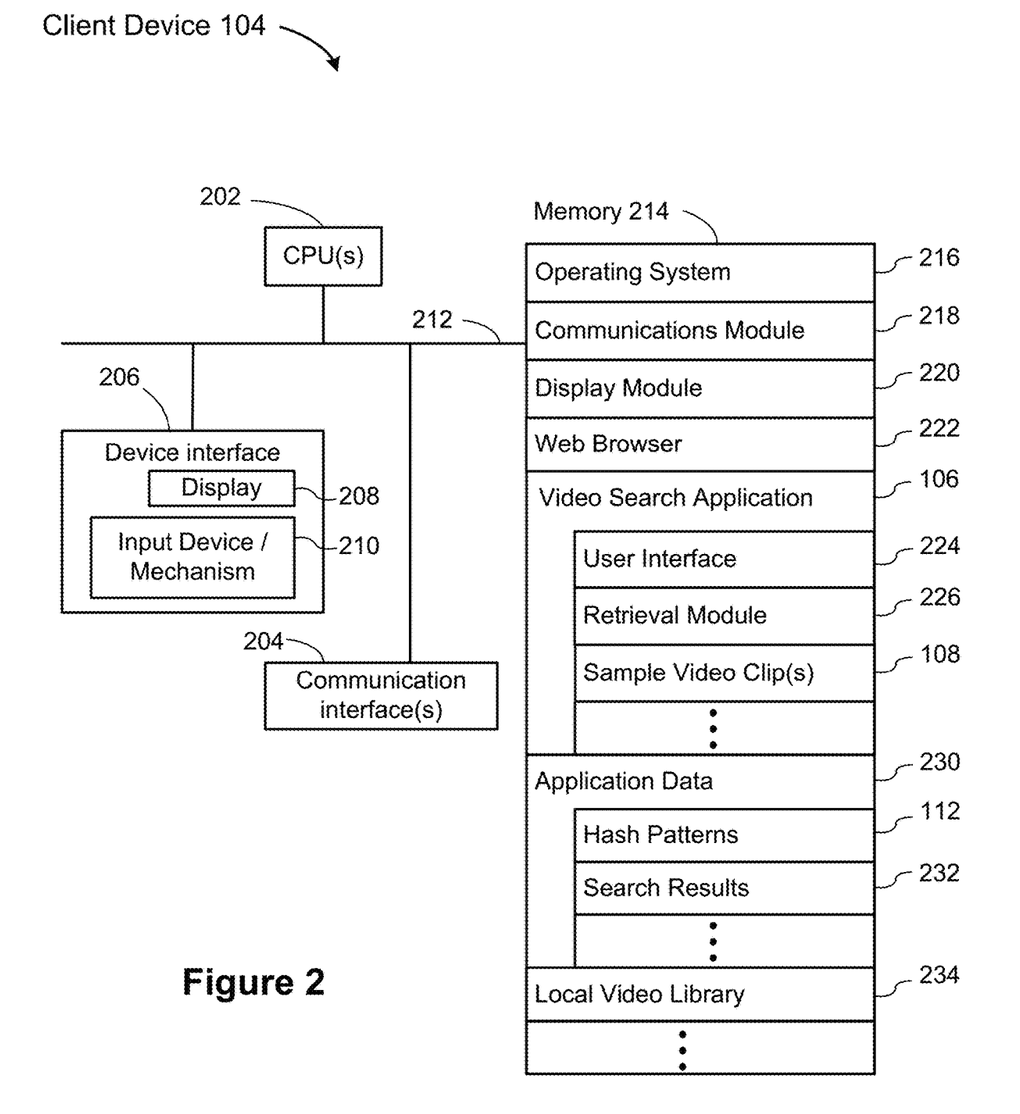
FIG. 2 is a block diagram of a client device in accordance with some implementations.

FIG. 2 is a block diagram illustrating a client device 104 that a user uses to access a search application 106. A client device is also referred to as a computing device, which may be a tablet computer, a laptop computer, a smart phone, a desktop computer, a PDA, or other computing device than can run the search application 106 and has access to a communication network 102. A client device 104 typically includes one or more processing units (CPUs) 202 for executing modules, programs, or instructions stored in the memory 214 and thereby performing processing operations; one or more network or other communications interfaces 204; memory 214; and one or more communication buses 212 for interconnecting these components. The communication buses 212 may include circuitry (sometimes called a chipset) that interconnects and controls communications between system components. A client device 104 includes a device interface 206 comprising a display device 208 and one or more input devices or mechanisms 210. In some implementations, the input device/mechanism includes a keyboard and a mouse; in some implementations, the input device/mechanism includes a "soft" keyboard, which is displayed as needed on the display device 208, enabling a user to "press keys" that appear on the display 208.

In some implementations, the memory 214 includes high-speed random access memory, such as DRAM, SRAM, DDR RAM or other random access solid state memory devices. In some implementations, the memory 214 includes non-volatile memory, such as one or more magnetic disk storage devices, optical disk storage devices, flash memory devices, or other non-volatile solid state storage devices. In some implementations, the memory 214 includes one or more storage devices remotely located from the CPU(s) 202. The memory 214, or alternatively the non-volatile memory devices within the memory 214, comprises a non-transitory computer readable storage medium. In some implementations, the memory 214, or the computer readable storage medium of the memory 214, stores the following programs, modules, and data structures, or a subset thereof:

an operating system 216, which includes procedures for handling various basic system services and for performing hardware dependent tasks;

a communications module 218, which is used for connecting the client device 104 to other computers and devices via the one or more communication network interfaces 204 (wired or wireless) and one or more communication networks 102, such as the Internet, other wide area networks, local area networks, metropolitan area networks, and so on;

a display module 220, which receives input from the one or more input devices 210, and generates user interface elements for display on the display device 208;

a web browser 222, which enables a user to communicate over a network 102 (such as the Internet) with remote computers or devices;

a video search application 106, which enables a user to search and retrieve videos from one or more remote video libraries 120 and/or a local video library 234. The video search application 106 provides a user interface 224. The video search application 106 also includes a retrieval module 226, which retrieves videos corresponding to a match identified by the server 110. The video search application 106 accesses one or more sample video clip 108, which can be selected and/or identified by a user to be the basis for the search (e.g., to match the sample video clip 108 with one or more videos in remote video libraries 120 or a local video library 234). In some implementations, the sample video clip 108 is selected from (e.g., stored in) the local video library 234; and application data 230, which includes a set of hash patterns 112, as computed by the server 110, and search results 232 corresponding to a matched video from the remote video libraries 120. The search results 232 can include the matched video and/or identifying information corresponding to the matched video (e.g., a reel number, a time frame, and a location where the matched video is stored within the video library).

Each of the above identified executable modules, applications, or sets of procedures may be stored in one or more of the previously mentioned memory devices and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 stores a subset of the modules and data structures identified above. In some implementations, the memory 214 stores additional modules or data structures not described above.

Although FIG. 2 shows a client device 104, FIG. 2 is intended more as a functional description of the various features that may be present rather than as a structural schematic of the implementations described herein. In practice, and as recognized by those of ordinary skill in the art, items shown separately could be combined and some items could be separated.

Figure 3:
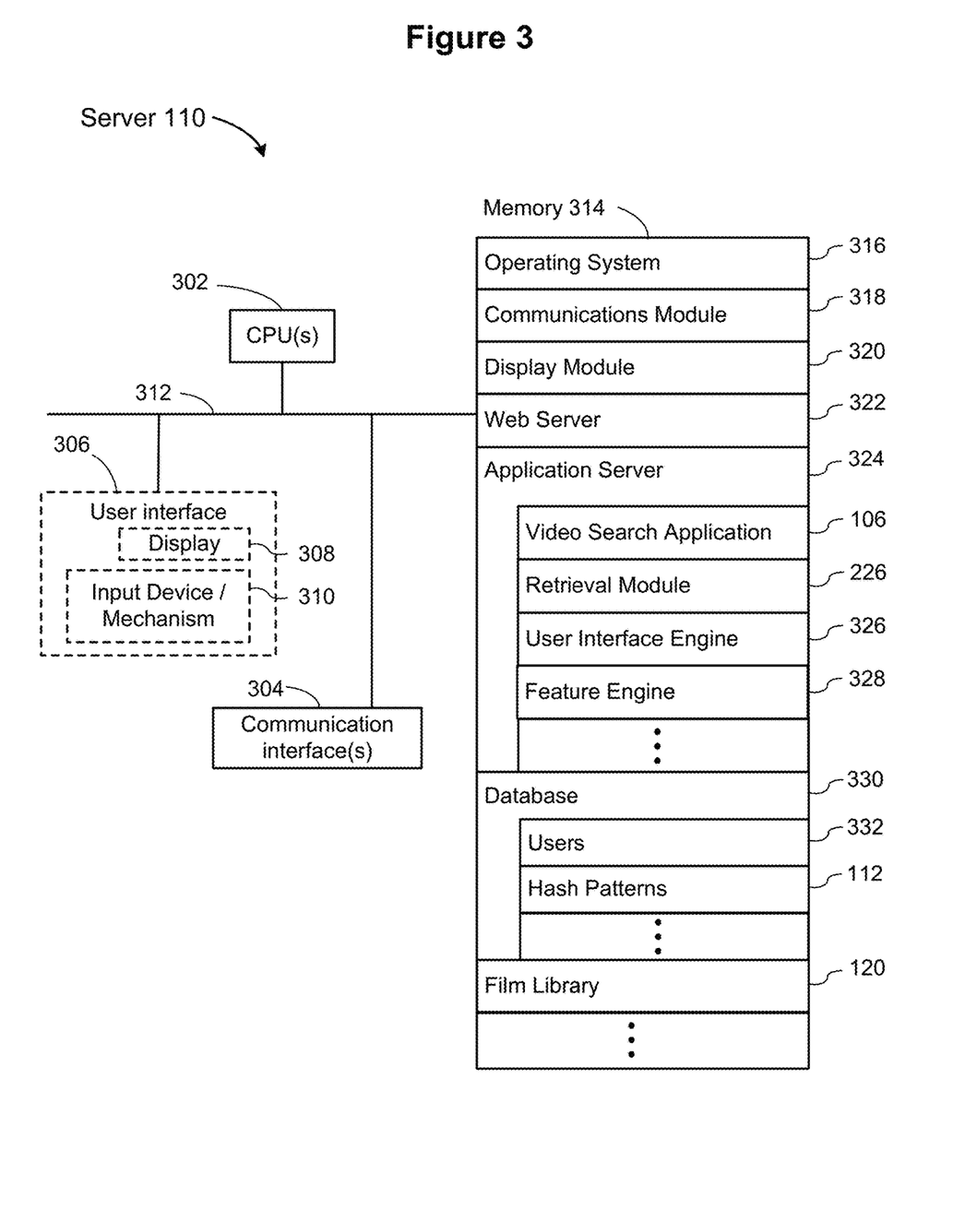
FIG. 3 is a block diagram of a server in accordance with some implementations.

FIG. 3 is a block diagram illustrating a server 110. In some implementations, the server 110 is one of a plurality of servers in a server system. A server 110 typically includes one or more processing units (CPUs) 302 for executing modules, programs, or instructions stored in the memory 314 and thereby performing processing operations; one or more network or other communications interfaces 304; memory 314; and one or more communication buses 312 for interconnecting these components. The communication buses 312 may include circuitry (sometimes called a chipset) that interconnects and controls communications between system components. In some implementations, the server 110 includes a user interface 306, which may include a display device 308 and one or more input devices 310, such as a keyboard and a mouse.

In some implementations, the memory 314 includes high-speed random access memory, such as DRAM, SRAM, DDR RAM or other random access solid state memory devices. In some implementations, the memory 314 includes non-volatile memory, such as one or more magnetic disk storage devices, optical disk storage devices, flash memory devices, or other non-volatile solid state storage devices. In some implementations, the memory 314 includes one or more storage devices remotely located from the CPU(s) 302. The memory 314, or alternatively the non-volatile memory devices within the memory 314, comprises a non-transitory computer readable storage medium. In some implementations, the memory 314, or the computer readable storage medium of the memory 314, stores the following programs, modules, and data structures, or a subset thereof:

an operating system 316, which includes procedures for handling various basic system services and for performing hardware dependent tasks;

a communications module 318, which is used for connecting the server 110 to other computers via the one or more communication network interfaces 304 (wired or wireless) and one or more communication networks 102, such as the Internet, other wide area networks, local area networks, metropolitan area networks, and so on;

a display module 320, which receives input from one or more input devices 310, and generates user interface elements for display on a display device 308;

one or more web servers 322, which receive requests from client devices 104, and return responsive web pages, resources, or links. In some implementations, each request is logged in the database 330;

one or more application servers 324, which provide various applications (such as a video search application 106) to the client devices 104. In some instances, applications are provided as a set of web pages, which are delivered to the client devices 104 and displayed in a web browser 222. The web pages are delivered as needed or requested. In some instances, an application is delivered to a client device 104 as a download, which is installed and run from the client device 104 outside of a web browser 222;

in some implementations, the application server provides a retrieval module 226 as part of the video search application 106. In other implementations, the retrieval module 226 is a separate application provided by the application server 324. The retrieval module retrieves videos (e.g., from the film libraries 120) corresponding to search results identified based on the hash patterns 112;

some implementations include a user interface engine 326, which provides the user interface 224 for users of the video search application 106;

some implementations include a feature engine 328, which identifies and compares features for sample video clips received from the video search application 106 on a client device 104 and library video clips from the film libraries 120. In some implementations, the feature engine 328 also computes differential frames, and/or computes hash patterns based on the feature points identified by the feature engine 328;

one or more databases 330, which store various data used by the modules or programs identified above. In some implementations, the database 330 includes a list of authorized users 332, which may include user names, encrypted passwords, and other relevant information about each user. The database 330 also stores the computed hash patterns 112; and in some cases, the server 110 includes a film library 120, which contains library video clips 122 to be matched to the sample video clips 108 selected by the client device 104.

Each of the above identified elements in FIG. 3 may be stored in one or more of the previously mentioned memory devices. Each executable program, module, or procedure corresponds to a set of instructions for performing a function described above. The above identified modules or programs (i.e., sets of instructions) need not be implemented as separate software programs, procedures or modules, and thus various subsets of these modules may be combined or otherwise re-arranged in various implementations. In some implementations, the memory 314 stores a subset of the modules and data structures identified above. Furthermore, the memory 314 may store additional modules or data structures not described above.

Although FIG. 3 illustrates a server 110, FIG. 3 is intended more as functional illustration of the various features that may be present in a set of one or more servers rather than as a structural schematic of the implementations described herein. In practice, and as recognized by those of ordinary skill in the art, items shown separately could be combined and some items could be separated. The actual number of servers used to implement these features, and how features are allocated among them, will vary from one implementation to another, and may depend in part on the amount of data traffic that the system must handle during peak usage periods as well as during average usage periods.

As illustrated in FIGS. 2 and 3, the functionality for a search application may be shared between a client device 104 and a server system 110. In some implementations, after the search application is installed on a client device 104, the majority of the subsequent processing occurs on the client device. For example, the hash patterns 112 may be stored solely at the client device 104, and not on a server 110. In other implementations, the majority of the processing and data storage occurs at a server 110, and the client device 104 uses a web browser 222 to view and interact with the data. For example, the hash patterns 112 may be stored only at the server system 110. One of skill in the art recognizes that various allocations of functionality between the client device 104 and the server system 110 are possible, and some implementations support multiple configurations (e.g., based on user selection).

In some implementations, an edit decision list (EDL), which describes a cut of a film (e.g., a library video clip 122) for reconstructing a film clip from an original set of film (e.g., from the film library 120) manually. For example, an EDL may describe which clips of film from a larger film library were selected in making a final cut (e.g., which time, reel, and take each clip originates from). A method of feature mapping may be used to identify which parts of the film library 120 were used in a particular sample video clip 108. For example, feature mapping may include identifying a few pixels that contain a lot of data (e.g., distinguishing features) in a frame of the video clip. The feature mapping may track the rough shape (e.g., outline) of the frame and compare that outline with a feature mapping of the library. However, this method does not always produce results because some features may not return a "match" after the video clip has been edited (e.g., cropped or color-corrected) or may not distinguish between different "takes" that were filmed and are included in the library.

In some implementations, automatic matching of video clips (which may be altered) allows for automatic matching of clips that occur at different resolutions. For example, the method of matching by comparing patterns allows for matching a first set of frames with a second set of frames, even if the first set of frames has been cropped, color-corrected, or appears tilted (e.g., by using a pan and scan) as compared to the second set of frames. When these modifications have occurred, no direct visual match may exist between the first set of frames and the second set of frames, and thus a direct comparison may not produce any resulting matches.

In some implementations, the method of matching the first set of frames (e.g., a sample video clip 108) and the second set of frames (e.g., from the film library 120) comprises looking at two frames from each set of frames and finding the difference between the two frames (e.g., to create a differential frame representing the difference between the two frames). The first set of frames may include a plurality of differential frames and the second set of frames may include a plurality of differential frames. The method further comprises identifying features of the differential frames and identifying how these features move (e.g., the motion signature of the differential frame). The identification of how these features move can be encoded and represented by a number or a hash value. The first set of frames can then be represented by a pattern (e.g., a string of numbers). This pattern of the first set of frames (e.g., the sample video clip) may be compared to the pattern of the second set of frames (e.g., the film library 120) to find a match that identifies the subset or subsets of the second set of frames.

In some implementations, the method of matching is able to discern between clips where the clips include a same actor on a same set (e.g., multiple "takes" that appear to be of the same content) based on differences that even a human eye could not detect. For example, a human may not be able to discern the precise hand movement of the actor's hand wave in front of the same background, but comparing the motion vectors (e.g., movement of the feature vectors of differential frames) allows for distinguishing between multiple takes of a same actor on a same set.

FIGS. 4A-4D illustrates identifying differences between two frames, in accordance with some implementations. The computing system identifies features over a time period within the sample video clip 108, instead of just looking at a single frame (e.g., either the frame shown in FIG. 4A or the frame shown in FIG. 4B separately). FIGS. 4A-4D illustrate identifying features over a time period by retrieving two consecutive frames, computing the difference between the frames, and defining features within the difference (e.g., the brightest points in the difference image). A few of the features (e.g., 3-5 features) are then selected for use. The method is not limited to this specific implementation of detecting features over time, nor this definition of "feature" as the brightest points in the image. In each case, however, the features are based on differential frames that show movement between the two frames.

Figure 4A:
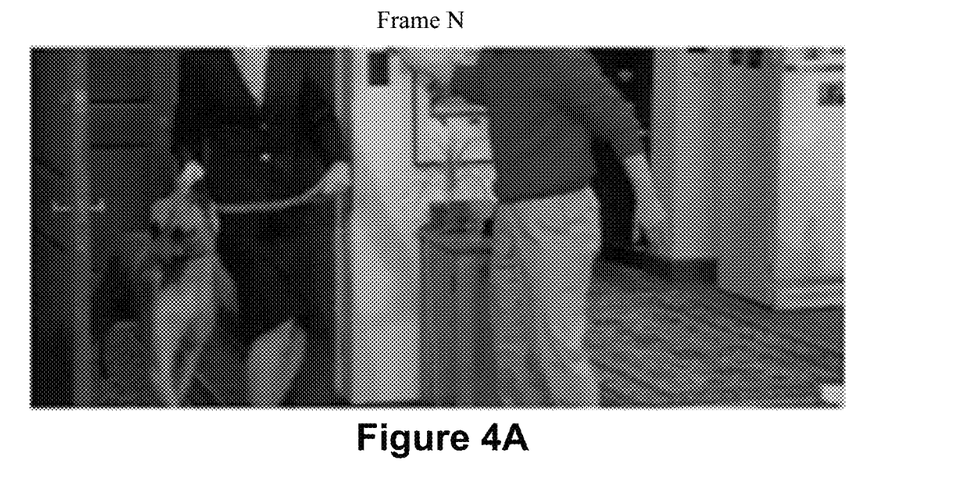
FIGS. 4A-4C illustrates identifying a differential frame from two temporally sequenced frames, in accordance with some implementations.
Figure 4B:
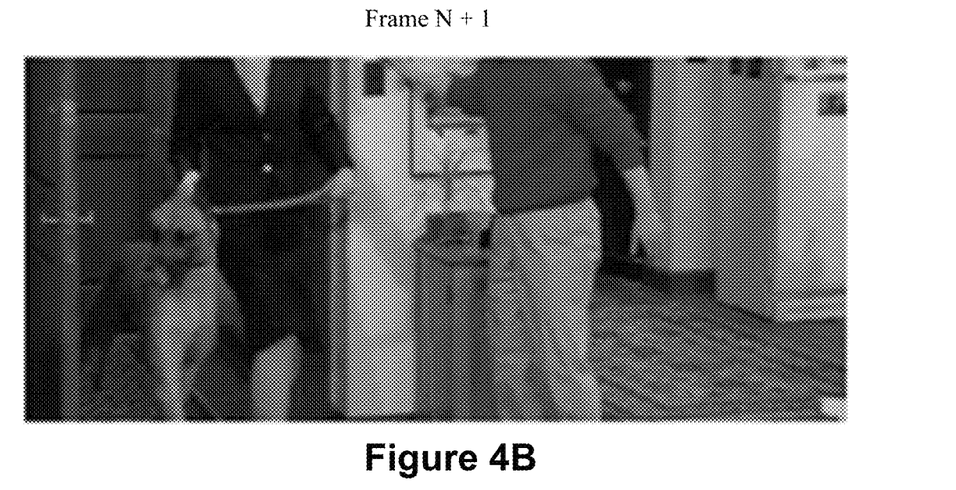

The method includes, at a computing system 110, receiving a sample video clip 108, which is a first temporal sequence of three or more image frames. The system 110 then computes a first hash pattern for the sample video clip. In some implementations, the sample video clip 108 is provided from a client device 104 (e.g., with a request from a user of the client device, via the video search application 106, to match the sample video clip 108 to library video clips 122 stored in the video libraries 120). For example, FIGS. 4A and 4B illustrate two image frames from a sample video clip. The frame illustrated in FIG. 4A is temporally sequenced before the frame illustrated in FIG. 4B. In some implementations, the video frames are consecutive. In other implementations, the two frames are separated by one or more frames (e.g., to have more measurable movement between the frames that are used to construct the differential frame). For example, to compete the differential frames, some implementations sample the frames (e.g., every 10th frame), and compute the differences between the samples.

Figure 4C:
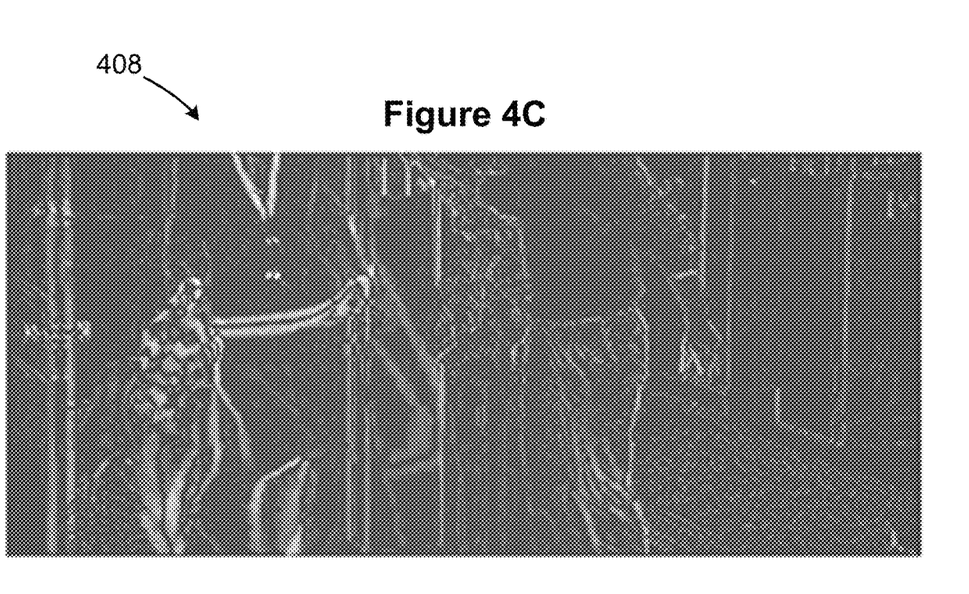

The first step (i) in computing the first hash pattern for the video clip includes: computing a temporal sequence of differential frames, where each differential frame comprises pixel differences between a respective pair of image frames in the temporal sequence of three or more video frames. For example, FIG. 4C illustrates a differential frame 408 corresponding to the frames illustrated in FIGS. 4A and 4B. Thus, the computing system computes differential frames between respective pairs of image frames. In some implementations, the computing system 110 computes differential frames between each consecutive pair of sampled image frames. For example, if there are three temporally sequenced image frames, frame 1, frame 2 and frame 3, two differential frames are computed: the differential frame between frame 1 and frame 2 and the differential frame between frame 2 and frame 3. In some implementations, the computing system does not compute differential frames between each respective pair (e.g., skipping one or more consecutive pairs). For example, if there are four temporally sequenced image frames: frame 1, frame 2, frame 3 and frame 4, the computing system may compute a differential frame between frame 1 and frame 2 and a differential frame between frame 3 and frame 4 (e.g., without computing a differential frame between frame 2 and frame 3). Differential frames are computed between pairs of image frames in a temporal sequence in various patterns, including between each consecutive pair or skipping one or more consecutive pairs in the sequence.

In some implementations, a first image frame of the three or more image frames of the first temporal sequence comprises a first plurality of pixels and a second image frame of the three or more image frames of the first temporal sequence comprises a second plurality of pixels. Computing the temporal sequence of differential frames for the first temporal sequence comprises applying an optical flow algorithm to identify a motion vector corresponding to the first plurality of pixels compared with the second plurality of pixels.

Figure 4D:
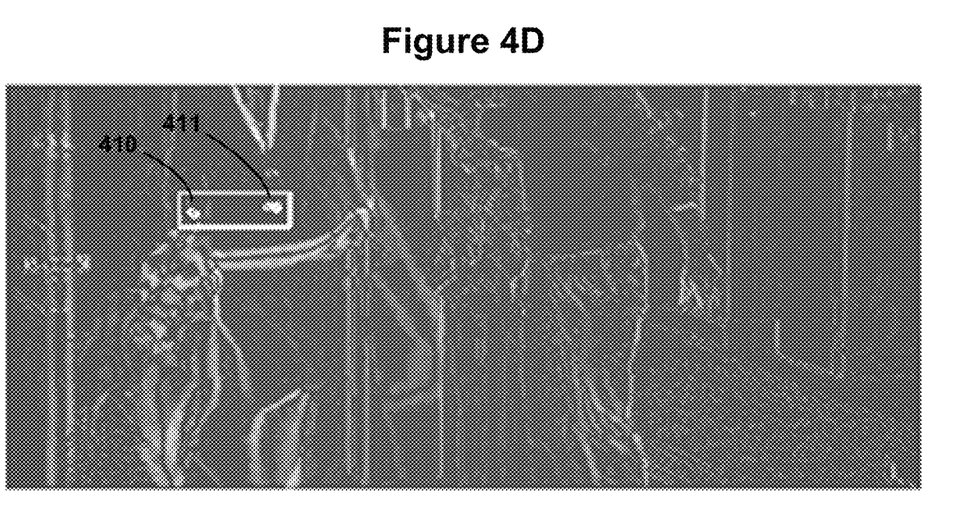
FIG. 4D illustrates identifying features in a differential frame, in accordance with some implementations.

The second step (ii) in computing the first hash pattern further includes, for each differential frame (e.g., the differential frame 408): identifying a respective plurality of feature points (e.g., the feature points 410 and 411), and computing a respective hash value that represents spatial positioning of the respective feature points with respect to each other. The first hash pattern comprises the computed hash values.

FIG. 4D illustrates identified feature points 410 and 411 within the differential frame 408, in accordance with some implementations. The computing device 110 may repeat the process to identify additional feature points in each differential frame.

In some implementations, the plurality of feature points identified for each differential frame are: (a) a set of brightest pixels of the respective frame; (b) a set of pixels with steepest surrounding gradient; (c) a set of pixels with brightness that satisfies a threshold; and/or (d) a set of pixels that match a predefined shape.

On a per-frame basis (e.g., for each differential frame), the feature points 410 and 411 (e.g., "features over time") that have been identified are encoded (e.g., to compute a hash value). For example, an encoding method is used that will result in the same (or very nearly the same) output even when the input images have been modified. For example, one method of encoding takes the 3 most prominent features in the frame and computes the angle that they describe (e.g., the smallest angle), and stores that value as the hash for that frame. Some implementations use alternative methods, such as: (a) using more features (e.g., 4 or 5 features), drawing theoretical line segment between each, and storing all the angles described; or (b) measuring the area of the triangle drawn by three primary features and storing the size of the triangle as a percentage of the area of the differential frame.

After creating the hash value for each differential frame, the hash values create a hash pattern by temporally sequencing the hash values according to the temporal sequence of the differential frames.

In some implementations, the methods described above are applied, encoded, and stored for every frame in the large collection of library video clips 122 stored in the film libraries 120, and for every frame in the sample video clip 108 input into the video search application 106. As described above, each library video clip 122 and each sample video clip 108 can be processed to form a string of hashes. In some implementations, the string of hashes for each video clip is stored in the hash patterns 112. In some implementations, these techniques are applied to a sampling of the image frames (e.g., every nth frame, where n=5, 10, 20, or 30).

In some implementations, computing the hash value for a differential frame comprises: (i) identifying three most prominent feature points of the respective differential frame; (ii) computing an area of a triangle formed by the three most prominent feature points; and (iii) specifying the hash value as the ratio of the area of the triangle to the area of the differential frame.

In some implementations, computing the hash value for a differential frame comprises identifying three most prominent feature points of the differential frame and specifying the hash value as a smallest angle formed by line segments between the three most prominent features.

In some implementations, computing the hash value for a differential frame comprises identifying three most prominent feature points of the differential frame and specifying the hash value as a single value that encodes an ordered sequence of angles formed by line segments between the three most prominent features.

In some implementations, the plurality of feature points identified in each differential frame (e.g., in a temporal sequence comprising a first differential frame and a second differential frame) correspond to a same set of feature points.

In some instances, the method includes receiving a second library video clip (distinct from the first library video clip), which includes a second temporal sequence of three or more image frames. The method computes a second hash pattern for the second library video clip by applying steps (i) and (ii) above to the second temporal sequence of three or more image frames.

In general, the library video clip includes more image frames than the sample video clip. In some implementations, a video clip (e.g., a subset of clips) may be generated from a larger film library (e.g., edited down from multiple camera angles, multiple takes, and different reel-frames). For example, the video clip may be a commercial advertisement, a full-length movie, a partial clip, or a television show. In some implementations, the method allows reconstruction and/or identification of video fragments (e.g., edits) from a film library 120.

In some implementations, the computing device compares the hash patterns of the first sample video clip and the second library video clip. For example, the computing device calculates the sum of the absolute values of the differences in hashes for each position the search clip could fit relative to the library clip as shown in FIG. 5.

In some implementations, the method computes a distance between the first hash pattern and the second hash pattern as a sum of absolute differences between corresponding hash values in the first and second hash patterns and determines that the first and second video clips match when the computed distance is less than a threshold distance.

In some implementations, the second hash pattern for the library video clip comprises a plurality of subsets of the second hash pattern, each subset of the second hash pattern corresponds to a portion of the second video clip, and each subset of the second hash pattern has a length equal to the length of the first hash pattern for the sample video clip. For example, if the library video is longer (e.g., has a greater number of image frames) than the sample video clip, the hash pattern created for the second video clip will also be longer than the hash pattern created for the sample video clip (in many cases, much longer). Thus, the system takes smaller portions (e.g., subsets) of the hash pattern created for the library video clip so that the lengths of the hash patterns for the sample video clip and library video clip are equal (and can be compared).

In some implementations, the method computes a distance between the first hash pattern and each subset of the second hash pattern hash pattern and determines that a respective subset of the second hash pattern of the plurality of subsets of the second hash pattern is a match when the computed distance between the respective subset and the first hash pattern is smaller than the computed distances between the other subsets of the plurality of subsets and the first hash pattern.

By summing the absolute values of the differences, the computing device determines how much the search string (e.g., the hash pattern for the sample video clip) deviates from the comparison string (e.g., the hash pattern for the library video clip) at each location. The computing device finds the comparison string and the location in that comparison string (e.g., across all, or a plurality of, video clips in the film libraries 120, and all locations in those shots) where the sum has the smallest value.

FIGS. 5A-5D show an example of comparing hash patterns, in accordance with some implementations. The first row 530 in each table, "Comparison," corresponds to the hash pattern computed for a library video clip 122. The hash pattern is computed as a sequence of numbers, "7, 3, 5, 1, 3, 9, 7, 0, 9." The second row of each table, "Search," corresponds to the hash pattern computed for a sample video clip 108. The hash pattern for the sample video clip 108 was computed as the sequence of numbers "1, 4, 9." In this example, the hash pattern for the sample video clip is shorter in length than the hash pattern for the library video clip, which is typical. Thus, each table in FIGS. 5A-5D shows a comparison between the hash pattern for the sample video clip 108 and a contiguous subset of the hash pattern for the library video clip 122, where the subset has a length equal to the length of the hash pattern for the sample video clip.

Figure 5A:
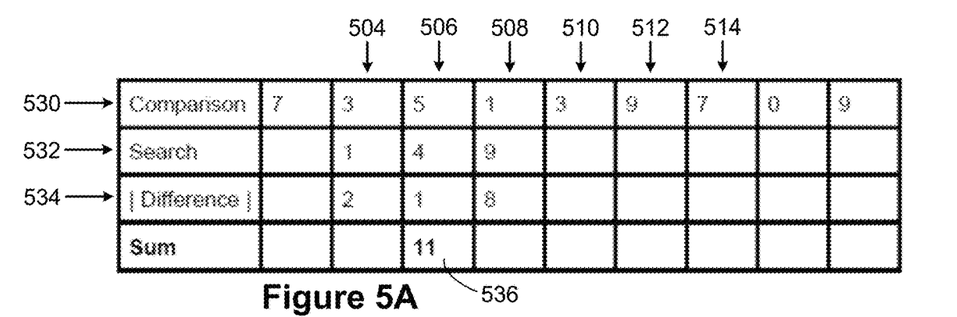
FIGS. 5A-5D illustrate comparing hash patterns, in accordance with some implementations.
Figure 5B:
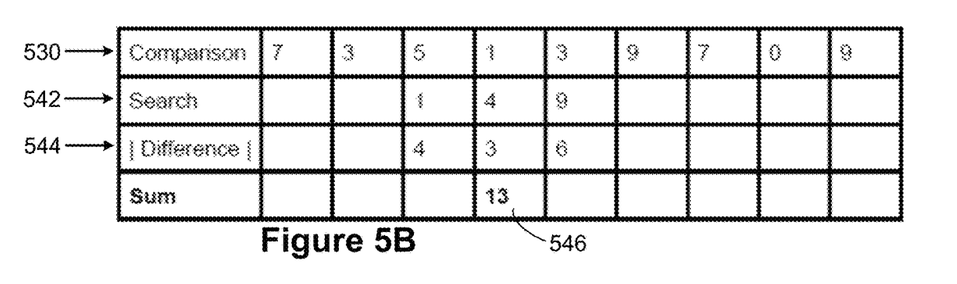
Figure 5C:
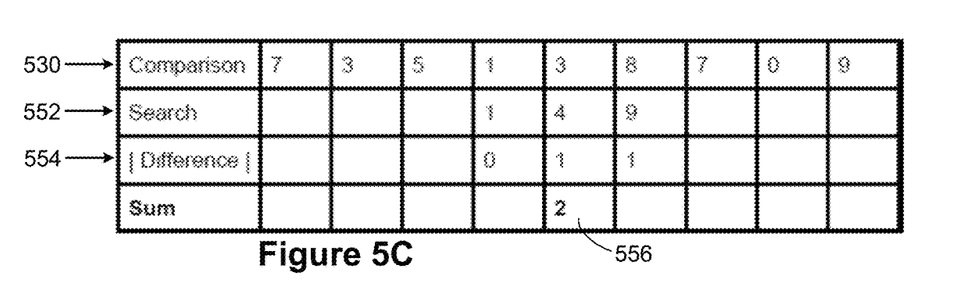
Figure 5D:
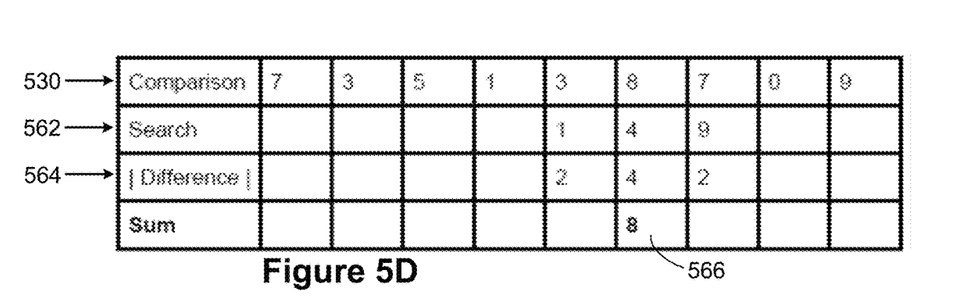

In FIG. 5A, the hash values for the sample video clip 108 in the search row 532 are aligned with the columns 504, 506, and 508 of the library clip 122. In FIG. 5B, the hash values for the sample video clip 108 are shifted to the right in the search row 542 to align with the columns 506, 508, and 510 of the video clip 122. In FIG. 5C, the hash values for the sample video clip 108 are shifted to the right again in the search row 552, thereby aligning with the columns 508, 510, and 512 of the library video clip 122. Finally, in FIG. 5D, the hash values for the sample video clip 108 are shifted to the right once again in the search row 562 to align with the columns 510, 512, and 514 of the library video clip. In this way, the sample video clip 108 is compared to all of the possible locations within the library video clip 122.

The third row of each table, "|Difference|," illustrates the computed absolute difference between the hash values for the sample video clip 108 and the hash values for the library video clip (e.g., the column-wise difference between the first two rows). In FIG. 5A, the differences shown in the third row 534 are computed for the columns 504, 506, and 508. The absolute differences are 2, 1, and 8, producing a total difference of 11, as shown in the Sum cell 536. In FIG. 5B, the differences shown in the third row 544 are computed for the columns 506, 508, and 510. The absolute differences are 4, 3, and 6, producing a total of 13, as indicated in the Sum cell 546. In FIG. 5C, the differences shown in the third row 554 are computed for the columns 508, 510, and 512. The absolute differences are 0, 1, and 1, producing a total of 2, as indicated in the Sum cell 556. Finally, in FIG. 5D, the differences shown in the third row 564 are computed for the columns 510, 512, and 514. The absolute differences are 2, 4, and 2, producing a total of 8, as indicated in the Sum cell 566.

As illustrated in the Difference rows 534, 544, 554, and 564, the sum of the absolute differences is calculated (in each table) for different portions of the library video clip 122. The sum 556 is the smallest in the third table shown in FIG. 5C. As long as this smallest number is less than a threshold value, it is designated as a match. In general, however, even the smallest sum will be too large. The process shown here is repeated for other library video clips to identify the best matching position within each clip and find the library video clip that has a smallest sum. For example, the hash values for the sample video clip 108 may be compared to hash values for thousands or millions of library video clips 122. Because the library video clips are known in advance, the hash patterns 112 for the library video clips 122 can be computed and stored in advance. If the sample video clip does match a specific library video clip, it typically results in a sum of absolute hash differences that is below a threshold value and also significantly lower than the sums for the other library video clips. In this case, the match not only identifies the matching video clip 122, but also the position within the matching video clip.

FIGS. 5A-5D illustrate using absolute differences to compare hash values. Alternative implementations compute hash differences in other ways, which typically depends on how the hash values are constructed. For example, a single hash value may consist of several components, and the comparison of hash values compares the individual components. An example of this is where each hash value is computed using three prominent features in each differential image, and the hash consists of computing three angles formed by line segments between the prominent features. The hash value for an individual differential frame stores the three angles (e.g., ordered by size or ordered by spatial location within the differential image). When comparing two of these hash values, the difference is the absolute difference computed for the individual components.

The techniques here can be applied in a variety of ways. For example, the "Features" can be selected in many different ways:

The brightest pixels.

Pixels that have the steepest surrounding gradient. That is, pixels that have a very different brightness than their neighbors. The pixel can be a very bright pixel surrounded by very dark pixel, or a very dark pixel surrounded by very bright pixel.

A set of neighboring pixels that, when their brightness values are summed, exceed some limit. This allows a feature to be larger than a pixel, or a pixel and its immediate neighbors.

A set of neighboring pixels that describes a pre-defined shape. This can be something like a line or curve of sufficient length, a circle or triangle or other 2D shape of sufficient size, and so on.

Any combination of the above.

Once the features are defined, the hashes for the differential frames can be computed in a variety of ways. The hash for an individual frame is sometimes referred to as the "Feature Hash," "Feature Encoding," or "Motion Signature." For example, the hash can be computed as:

The number of features found.

The angle described by the three most prominent features (e.g., the smallest angle or the largest angle).

If it is known that the image was not rotated in the final edit (aka camera rotation, aka dutching the camera), then it is possible to use the angle between a horizontal line, and a line between first the two most prominent features. This requires only two features, while the previous example requires three features.

The area of a shape described by some number of features expressed as a percentage of the area of the entire frame. A percentage or fraction is used instead of area in terms of number of pixels, because when an image has been scaled the area of the shape does not make a good signature.

The circumference of a shape described by some number of features expressed as a percentage of the circumference of the entire frame. A percentage or fraction is used instead of length in terms of number of pixels, because when the image has been scaled the circumference of the shape does not make a good signature.

Any combination of the above.

Regardless of which features are used and how the feature hashes are computed, the overall method is the same: the process "marches" through the sample clip to compare against a library clip, as illustrated in FIGS. 5A-5D. At each step, the hash deviations between each frame are computed and summed. The location in all the library clip where the sum is the smallest is the best location.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of comparing video clips, comprising:
at a computing system having one or more processors and memory:
receiving a first video clip comprising a first temporal sequence of three or more image frames;
computing a first hash pattern for the first video clip, including:
(i) computing a temporal sequence of differential frames, each differential frame comprising pixel differences between a respective pair of consecutive image frames in the temporal sequence of three or more video frames;
(ii) for each differential frame:
identifying a respective plurality of feature points; and
computing a respective hash value that represents spatial positioning of the respective feature points with respect to each other, including:
identifying three most prominent feature points of the respective differential frame; and
specifying the respective hash value as: (A) a ratio of an area of a respective triangle formed by the three most prominent feature points to an area of the respective differential frame, (B) a smallest angle formed by line segments between the three most prominent features, or (C) a single value that encodes an ordered sequence of angles formed by line segments between the three most prominent features;
wherein the first hash pattern comprises the computed hash values;
receiving a second video clip comprising a second temporal sequence of three or more image frames;
computing a second hash pattern for the second video clip by applying steps (i) and (ii) to the second temporal sequence of three or more image frames;
computing a distance between the first hash pattern and the second hash pattern as a sum of absolute differences between corresponding hash values in the first and second hash patterns; and
determining that the first and second video clips match when the computed distance is less than a threshold distance.

2. The method of claim 1, wherein the second video clip includes a number of image frames greater than a number of image frames of the first video clip.

3. The method of claim 1, wherein:
the second hash pattern for the second video clip comprises a plurality of subsets of the second hash pattern;
each subset of the second hash pattern corresponds to a portion of the second video clip; and
each subset of the second hash pattern has a length equal to a length of the first hash pattern for the first video clip.

4. The method of claim 3, further comprising computing a distance between the first hash pattern and each subset of the second hash pattern hash pattern; and
determining that a respective subset of the second hash pattern of the plurality of subsets of the second hash pattern is a match in accordance with a determination that the computed distance between the respective subset and the first hash pattern is smaller than the computed distances between the other subsets of the plurality of subsets and the first hash pattern.

5. The method of claim 1, wherein:
a first image frame of the three or more image frames of the first temporal sequence comprises a first plurality of pixels;

a second image frame of the three or more image frames of the first temporal sequence comprises a second plurality of pixels;

computing the temporal sequence of differential frames for the first temporal sequence comprises applying an optical flow algorithm to identify a motion vector corresponding to the first plurality of pixels compared with the second plurality of pixels.

6. The method of claim 1, wherein the plurality of feature points identified for each differential frame comprise features of the respective frame selected from the group consisting of a set of brightest pixels of the respective frame, a set of pixels with steepest surrounding gradient, a set of pixels with brightness that satisfies a threshold, and a set of pixels that match a predefined shape.

7. The method of claim 1, wherein the plurality of feature points identified in each differential frame correspond to a same set of feature points.

8. The method of claim 1, further comprising:
receiving a third video clip comprising a third temporal sequence of three or more image frames;
comparing the pattern for the first video clip with the pattern for the third video clip to determine a match between the patterns, including:
computing a third hash pattern for the third video clip by applying steps (i) and (ii) to the third temporal sequence of three or more image frames;
computing a distance between the first hash pattern and the third hash pattern as a sum of absolute differences between corresponding hash values in the first and third hash patterns;
comparing the computed distance between the first hash pattern and the second hash pattern with the computed distance between the first hash pattern and the third hash pattern; and
in accordance with a determination that the computed distance between the first hash pattern and the third hash pattern is less than the computed distance between the first hash pattern and the second hash patter, determining that the first and third video clips match.

9. An electronic device having one or more processors and memory storing one or more programs executable by the one or more processors, the one or more programs including instructions for:
receiving a first video clip comprising a first temporal sequence of three or more image frames;
computing a first hash pattern for the first video clip, including:
(i) computing a temporal sequence of differential frames, each differential frame comprising pixel differences between a respective pair of consecutive image frames in the temporal sequence of three or more video frames;
(ii) for each differential frame:
identifying a respective plurality of feature points; and
computing a respective hash value that represents spatial positioning of the respective feature points with respect to each other, including:
identifying three most prominent feature points of the respective differential frame; and
specifying the respective hash value as: (A) a ratio of an area of a respective triangle formed by the three most prominent feature points to an area of the respective differential frame, (B) a smallest angle formed by line segments between the three most prominent features, or (C) a single value that encodes an ordered sequence of angles formed by line segments between the three most prominent features;
wherein the first hash pattern comprises the computed hash values;
receiving a second video clip comprising a second temporal sequence of three or more image frames;
computing a second hash pattern for the second video clip by applying steps (i) and (ii) to the second temporal sequence of three or more image frames;
computing a distance between the first hash pattern and the second hash pattern as a sum of absolute differences between corresponding hash values in the first and second hash patterns; and
determining that the first and second video clips match when the computed distance is less than a threshold distance.

10. The electronic device of claim 9, wherein the second video clip includes a number of image frames greater than a number of image frames of the first video clip.

11. The electronic device of claim 9, wherein:
the second hash pattern for the second video clip comprises a plurality of subsets of the second hash pattern;
each subset of the second hash pattern corresponds to a portion of the second video clip; and
each subset of the second hash pattern has a length equal to a length of the first hash pattern for the first video clip.

12. The electronic device of claim 11, wherein the one or more programs further comprise instructions for:
computing a distance between the first hash pattern and each subset of the second hash pattern hash pattern; and
determining that a respective subset of the second hash pattern of the plurality of subsets of the second hash pattern is a match in accordance with a determination that the computed distance between the respective subset and the first hash pattern is smaller than the computed distances between the other subsets of the plurality of subsets and the first hash pattern.

13. The electronic device of claim 9, wherein:
a first image frame of the three or more image frames of the first temporal sequence comprises a first plurality of pixels;
a second image frame of the three or more image frames of the first temporal sequence comprises a second plurality of pixels;
computing the temporal sequence of differential frames for the first temporal sequence comprises applying an optical flow algorithm to identify a motion vector corresponding to the first plurality of pixels compared with the second plurality of pixels.

14. The electronic device of claim 9, wherein the plurality of feature points identified for each differential frame comprise features of the respective frame selected from the group consisting of a set of brightest pixels of the respective frame, a set of pixels with steepest surrounding gradient, a set of pixels with brightness that satisfies a threshold, and a set of pixels that match a predefined shape.

15. The electronic device of claim 9, further comprising:
receiving a third video clip comprising a third temporal sequence of three or more image frames;
comparing the pattern for the first video clip with the pattern for the third video clip to determine a match between the patterns, including:
computing a third hash pattern for the third video clip by applying steps (i) and (ii) to the third temporal sequence of three or more image frames;

computing a distance between the first hash pattern and the third hash pattern as a sum of absolute differences between corresponding hash values in the first and third hash patterns;

comparing the computed distance between the first hash pattern and the second hash pattern with the computed distance between the first hash pattern and the third hash pattern; and in accordance with a determination that the computed distance between the first hash pattern and the third hash pattern is less than the computed distance between the first hash, determining that the first and third video clips match.

16. A non-transitory computer-readable storage medium having one or more processors and memory storing one or more programs executable by the one or more processors, the one or more programs including instructions for:

receiving a first video clip comprising a first temporal sequence of three or more image frames;

computing a first hash pattern for the first video clip, including:
(i) computing a temporal sequence of differential frames, each differential frame comprising pixel differences between a respective pair of consecutive image frames in the temporal sequence of three or more video frames;
(ii) for each differential frame:
identifying a respective plurality of feature points; and
computing a respective hash value that represents spatial positioning of the respective feature points with respect to each other, including:
identifying three most prominent feature points of the respective differential frame; and
specifying the respective hash value as: (A) a ratio of an area of a respective triangle formed by the three most prominent feature points to an area of the respective differential frame, (B) a smallest angle formed by line segments between the three most prominent features, or (C) a single value that encodes an ordered sequence of angles formed by line segments between the three most prominent features;

wherein the first hash pattern comprises the computed hash values;

receiving a second video clip comprising a second temporal sequence of three or more image frames;

computing a second hash pattern for the second video clip by applying steps (i) and (ii) to the second temporal sequence of three or more image frames;

computing a distance between the first hash pattern and the second hash pattern as a sum of absolute differences between corresponding hash values in the first and second hash patterns; and determining that the first and second video clips match when the computed distance is less than a threshold distance.

* * * * *

UNITED STATES PATENT AND TRADEMARK OFFICE
CERTIFICATE OF CORRECTION

PATENT NO. : 10,997,427 B1  
APPLICATION NO. : 16/234250  
DATED : May 4, 2021  
INVENTOR(S) : DeBry

Page 1 of 1

It is certified that error appears in the above-identified patent and that said Letters Patent is hereby corrected as shown below:

In the Claims

Claim 4, Column 14, Line 56, please delete "second hash pattern hash pattern;" and insert --second hash pattern;--;

Claim 12, Column 16, Line 32, please delete "second hash pattern hash pattern;" and insert --second hash pattern;--.

Signed and Sealed this  
Sixth Day of July, 2021

Drew Hirshfeld  
*Performing the Functions and Duties of the  
Under Secretary of Commerce for Intellectual Property and  
Director of the United States Patent and Trademark Office*